(12) United States Patent
Crapsey, III et al.

(10) Patent No.: US 8,606,616 B1
(45) Date of Patent: Dec. 10, 2013

(54) SELECTION OF BUSINESS SUCCESS INDICATORS BASED ON SCORING OF INTENDED PROGRAM RESULTS, ASSUMPTIONS OR DEPENDENCIES, AND PROJECTS

(75) Inventors: Arthur H. Crapsey, III, Manchester, MO (US); Suzann W. Moore, Atlanta, GA (US); Brett Lee Pharr, Charlotte, NC (US); Miranda Stanfield Ewoldt, Mooresville, NC (US); Tiffany Stangland Caterina, Charlotte, NC (US); Keehln B. Powell, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 493 days.

(21) Appl. No.: 12/429,635

(22) Filed: Apr. 24, 2009

(51) Int. Cl.
*G06Q 10/00* (2012.01)
*G06Q 40/00* (2012.01)

(52) U.S. Cl.
USPC .................. 705/7.28; 705/7.36; 705/7.37

(58) Field of Classification Search
None
See application file for complete search history.

(56) References Cited

U.S. PATENT DOCUMENTS

| | | | | |
|---|---|---|---|---|
| 6,859,785 | B2 * | 2/2005 | Case .......................... | 705/36 R |
| 6,895,382 | B1 * | 5/2005 | Srinivasan et al. ........... | 705/7.17 |
| 7,155,510 | B1 * | 12/2006 | Kaplan ........................ | 709/224 |
| 7,840,896 | B2 * | 11/2010 | Tien et al. .................... | 715/243 |
| 2002/0173998 | A1 * | 11/2002 | Case ............................ | 705/7 |
| 2004/0102926 | A1 * | 5/2004 | Adendorff et al. ............ | 702/182 |
| 2005/0216831 | A1 * | 9/2005 | Guzik et al. .................. | 715/513 |
| 2006/0143116 | A1 * | 6/2006 | Sumner et al. ................ | 705/39 |
| 2006/0161471 | A1 * | 7/2006 | Hulen et al. .................. | 705/10 |
| 2007/0050237 | A1 * | 3/2007 | Tien et al. .................... | 705/11 |
| 2007/0271198 | A1 * | 11/2007 | Del Bianco et al. ......... | 705/36 R |
| 2008/0249957 | A1 * | 10/2008 | Masuyama et al. .......... | 705/36 R |

OTHER PUBLICATIONS

Microsoft Office Project Portfolio Server Dashboard 2007 manual, published by Microsoft Corporation 2006.*
Brian Headd, Redefining Business Success—distinguishing between closure and failure, Small Business Economics, 21, 51-61, Kluwer Academic Publishers, 2003.*
Bruderl et al, Network Support and the Success of Newly Founded Business, Small Business Economics 10, 213-225, Kluwer Academic Publishers, 1998.*

(Continued)

*Primary Examiner* — Mark A Fleischer
*Assistant Examiner* — Octavian Rotaru
(74) *Attorney, Agent, or Firm* — Michael A. Springs; Moore & Van Allen, PLLC; Jeffrey R. Gray

(57) ABSTRACT

Embodiments of the invention provide systems, methods, and computer program products for a business success indicator process that helps identify business success indicators for programs in the process of implementation. Within the process intended program results, and program assumptions or dependencies for projects within the program are considered potential business success indicators. Intended program results are prioritized, assessed, and assigned weighted values. Assumptions or dependencies, and projects are assigned impact values indicating their impact related to each of the intended program results. The intended program results, and the assumptions or dependencies are scored based on the weighted values and impact values. Business success indicators are selected based on the scores and deployment dates of projects with which they are associated. A business success indicator measurement plan is developed by developing a risk score associated with the data for each business success indicator.

27 Claims, 11 Drawing Sheets

| ANSWER | OPERATING | DATA NOT USED BY BUS. | AD HOC USE OF DATA | INDIRECT USE BY BUS. | DIRECT USE BY BUS. | HIGH | MED. | LOW | NO |
|---|---|---|---|---|---|---|---|---|---|
| DATA IS NOT COLLECTED | 5 | 5 | 3 | 3 | 3 | 70% | 82% | 82% | 82% |
| PROGRAM MGT / PMO / PROJECT TEAM | 4 | 5 | 3 | 2 | 0 | 76% | 86% | 90% | 100% |
| SUPPORT PARTNER | 3 | 5 | 3 | 1 | 0 | 82% | 89% | 96% | 100% |
| BUSINESS SUPPORT | 2 | 5 | 3 | 1 | 0 | 88% | 93% | 98% | 100% |
| BUSINESS OPERATIONS | 1 | 5 | 3 | 1 | 0 | | | | |
| NEED TO BUILD DATA SOURCE | 5 | 5 | 3 | 3 | 3 | 94% | 96% | 99% | 100% |
| MANUALLY COLLECTED | 4 | 5 | 3 | 3 | 3 | 70% | 82% | 82% | 82% |
| ENTERPRISE REPORTING | 3 | 5 | 3 | 1 | 0 | 76% | 86% | 86% | 86% |
| BUSINESS REPORTING SYSTEM | 2 | 5 | 3 | 1 | 0 | 82% | 89% | 96% | 100% |
| BUSINESS SYSTEM OF RECORD | 1 | 5 | 3 | 1 | 0 | 88% | 93% | 98% | 100% |
| DATA IS NOT COLLECTED | 5 | 5 | 3 | 3 | 3 | 94% | 96% | 99% | 100% |
| ANNUALLY/QUARTERLY | 4 | 5 | 3 | 3 | 3 | 70% | 82% | 82% | 82% |
| MONTHLY | 3 | 5 | 3 | 1 | 0 | 76% | 86% | 86% | 86% |
| WEEKLY | 2 | 5 | 3 | 1 | 0 | 82% | 89% | 96% | 100% |
| DAILY | 1 | 5 | 3 | 1 | 0 | 88% | 93% | 98% | 100% |
| NO DATA QUALITY MEASURES IN PLACE | 5 | 5 | 3 | 3 | 3 | 94% | 96% | 99% | 100% |
| YES – POPULATION VERIFICATION | 4 | 5 | 3 | 1 | 0 | 70% | 82% | 82% | 82% |
| YES – DATA VALIDATION | 3 | 5 | 3 | 1 | 0 | 76% | 86% | 96% | 100% |

(56) References Cited

OTHER PUBLICATIONS van Praag, Mirjam C, Business Survival and Success of Young Small Business Owners, Small Business Economics 21, 1-17, Kluwer Academic Publishers, 2003.*

Hull John C, Options, Futures and Other Derivatives 6th Edition, ISBN 0121499084, (selection) 2006.*

UMT Portfolio Manager, Builder User Training, UMT Portfolio Management, Dec. 2005.*

Microsoft Project Portfolio Server Overview manual 2007, published by Microsoft Corporation 2006.*

Microsoft Office Project Portfolio Server Optimizer 2007 manual, published by Microsoft Corporation 2006 https://www.am.ohio.gov/PortfolioServer/Manuals/MOPPS-Optimizer.pdf.*

Microsoft Office Project Portfolio Server Dashboard 2007 manual, published by Microsoft Corporation 2006 https://www.am.ohio.gov/PortfolioServer/Manuals/MOPPS-Dashboard.pdf.*

Hull John C, Options, Futures and Other Derivatives 6th Edition, ISBN 0121499084, 2006.*

Microsoft Office Project Portfolio Server Optimizer 2007 manual, published by Microsoft Corporation 2006.*

* cited by examiner

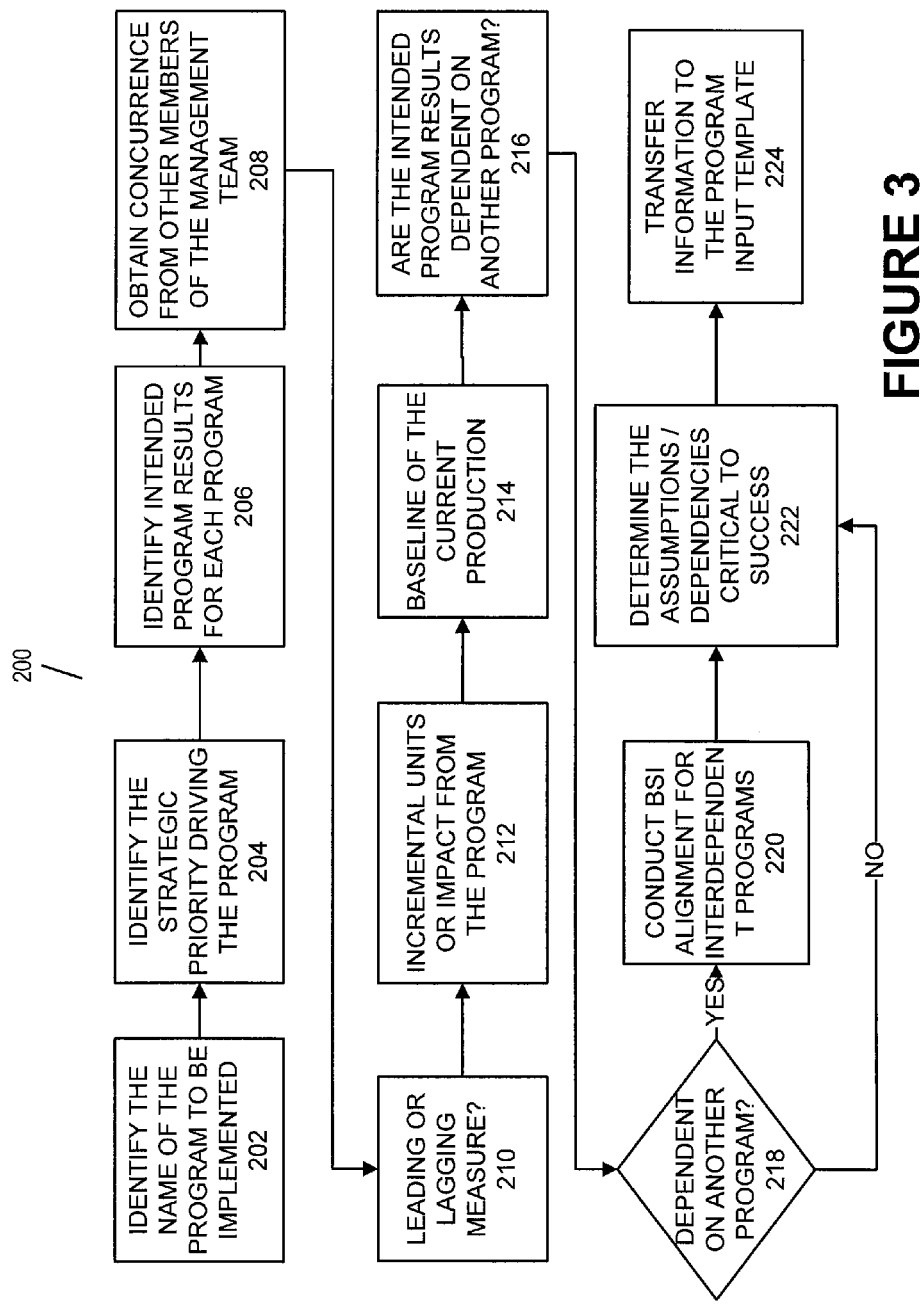

FIGURE 4

| 1202 | 1204 | 1212 | 1210 | 1214 | 1216 | 1218 | 1220 |
|---|---|---|---|---|---|---|---|
| THE NAME OF THE PROGRAM THAT WILL DELIVER THIS OBJECTIVE | STRATEGIC PRIORITY / BUSINESS OBJECTIVE | INTENDED PROGRAM RESULTS Name of Measure Impacted Minimum of 2 per program | Leading / Lagging | INCREMENTAL NUMBER of UNITS or INCREMENTAL AMOUNT of IMPACT | BASELINE (CURRENT PRODUCTION) (if applicable) | ARE THE BENEFITS OF THIS PROGRAM DEPENDENT UPON ANOTHER PROGRAM (Provide the Program Name) | ASSUMPTIONS/ DEPENDENCIES CRITICAL TO SUCCESS |
| | REVENUE GROWTH | MORE CONTACTS | | 35 | 25 | NO | DELIVERLY RATE |
| | | RATE CYCLE TIME | | 3 MINS PER CALL | 4 MINS PER CALL | | |
| | | FIRST PASS YIELD | | 75% | 50% | | |
| INCREASED SALES VOLUME | | | | | | | |

1200

| PROGRAM NAME: 1232 | LINE OF BUSINESS 1230 | | |
|---|---|---|---|
| BUSINESS CHANGE CAPABILITY | CORPORATE ENTERPRISE INITIATIVE DELIVERY | | |
| REQUESTED PROGRAM DEPLOYMENT DATE | 11/30/09 | | |
| INTENDED PROGRAM RESULT – WHAT TYPE OF CHANGE WILL RESULT? 1236 | DESCRIPTION | INCREMENTAL UNITS OR IMPACT | BASELINE |
| ASSOCIATE SATISFACTION 1237 | MORE CONTACTS | 35 | 25 |
| CUSTOMER SATISFACTION 1237 | RATE CYCLE TIME | 10 SECS. | 20 SECS. |
| INCREMENTAL UNITS OF EXISTING PRODUCT 1237 | FIRST PASS YIELD | 75% | 50% |
| NEW PRODUCT 1237 | WARM TRANSFER PROCESS | <10 SECS | |
| OPERATING METRIC 1237 | | | |
| REDUCED COST OR EXPENSE (INC REGULATORY CAPEX) 1237 | | | |
| REVENUE RECEIVED EARLIER INCREASES NPV 1237 | | | |
| CRITICAL TO SUCCESS ASSUMPTIONS – WHAT TYPE OF ASSUMPTIONS IS IT? 1238 | DESCRIPTION | NUMERIC ASSUMPTION | BASELINE |
| BUSINESS CASE ASSUMPTION | AVERAGE HANDLE | 3 MINS / CALL | 4 MIN / CALL |
| ASSOCIATE ADOPTION (%, PROFICIENCY) | CREW SKILLS | 90% HIGHLY PROFICIENT | 50% HIGHLY PROFICIENT |
| OTHER CRITICAL ASSUMPTION OR DEPENDENCY | | | |
| TECHNOLOGY RESOURCES (PEOPLE, HARDWARE, SOFTWARE, INFRASTRUCTURE) | | | |
| PROJECT NAMES & DEPLOYMENT DATES 1239 | PROJECT TITLE | ESTIMATED DEPLOYMENT DATE | |
| IDENTIFY THE NAME AND ESTIMATED DEPLOYMENT DATE OF THE FIRST PROJECT INCLUDED IN THIS PROGRAM. | IDEA MANAGEMENT (INNV) | 6/1/2009 | |
| IF YOU HAVE ANOTHER PROJECT PLEASE PROVIDE THE NAME AND ESTIMATED DEPLOYMENT DATE. | PLAYBOOK DEVELOPMENT (INNV) | 6/1/2009 | |
| IF YOU HAVE ANOTHER PROJECT PLEASE PROVIDE THE NAME AND ESTIMATED DEPLOYMENT DATE. | IDEA MGT SYSTEM ENHANCE (INNV) | 9/1/2009 | |

FIGURE 6

| CORPORATE ENTERPRISE INITIATIVE DELIVERY | | | | | | | |
|---|---|---|---|---|---|---|---|
| BUSINESS CHANGE CAPABILITY | | ASSUMPTIONS / DEPENDENCIES 1246 | | PROJECTS / TIMING 1248 | | | |
| INTENDED PROGRAM RESULTS 1242 | LOB PRIORITY WEIGHTING (LARGER # = HIGHER PRIORITY) 1244 | AVERAGE HANDLE | CREW SKILLS | IDEA MGT (INNV) | PLAYBOOK DEVEL. (INNV) | IDEA MGT SYSTEM ENHANCE | SIX SIGMA (6S) | ECMS REDESIGN (OPS) |
| | | | | 6/1/2009 | 6/1/2009 | 9/1/2009 | 6/30/2009 | 11/30/2009 |
| MORE CONTACTS | 4 | MOD IMPACT | HIGH IMPACT | HIGH IMPACT | MOD IMPACT | LOW IMPACT | NO IMPACT | MOD IMPACT |
| RATE CYCLE TIME | 1 | LOW IMPACT | MOD IMPACT | MOD IMPACT | MOD IMPACT | HIGH IMPACT | MOD IMPACT | MOD IMPACT |
| FIRST PASS YIELD | 3 | LOW IMPACT | HIGH IMPACT | NO IMPACT | MOD IMPACT | MOD IMPACT | LOW IMPACT | HIGH IMPACT |
| WARM TRANSFER PROCESS | 2 | LOW IMPACT | HIGH IMPACT | NO IMPACT | HIGH IMPACT | NO IMPACT | HIGH IMPACT | NO IMPACT |
| IMPACT | | 6 | 30 | 12 | 18 | 13 | 13 | 15 |
| RELATIONSHIP | | 18 | 84 | 39 | 42 | 22 | 24 | 42 |

1240

| INTENDED RESULTS | RAW WT. 1252 | BSI NORMALIZED 1254 |
|---|---|---|
| MORE CONTACTS | 112 | 28% |
| RATE CYCLE TIME | 25 | 6% |
| FIRST PASS YIELD | 78 | 19% |
| WARM TRANSFER PROCESS | 56 | 14% |
| | 0 | 0% |
| ASSUMPTIONS | | |
| AVERAGE HANDLE | 24 | 6% |
| CREW SKILLS | 112 | 27% |

1250

| | |
|---|---|
| SUM ASSUMPTION IMPACTS | 102 |
| SUM RESULTS IMPACTS | 271 |
| ASSUMPTIONS FACTOR | 1.33 |

| CORPORATE ENTERPRISE INITIATIVE DELIVERY BUSINESS CHANGE CAPABILITY | | | |
|---|---|---|---|
| USE DROP DOWN TO SELECT 1262 | POTENTIAL BSIs 1264 | PRIORITY (IF ASSIGNED) 1266 | RANKED IN ORDER OF IMPORTANCE (DESCENDING) 1268 |
| YES | MORE CONTACTS | 4 | 28% |
| NO | AVERAGE HANDLE | | 6% |
| YES | FIRST PASS YIELD | 3 | 19% |
| NO | RATE CYCLE TIME | | 6% |
| YES | CREW SKILLS | 1 | 27% |
| | | | 0% |
| NO | WARM TRANSFER PROCESS | 2 | 14% |
| | | 0 | 0% |
| | | | 0% |
| | | 0 | 0% |
| | | 0 | 0% |
| | | | 0% |
| | | | 0% |
| | | 0 | 0% |

1260

| REQUESTED PROGRAM DEPLOYMENT DATE 1278 | PROJECTS 1270 | ESTIMATED PROJECT DEPLOYMENT DATES 1272 | HIGH IMPACT 1274 | MODERATE IMPACT 1276 |
|---|---|---|---|---|
| 11/30/2009 | PLAYBOOK DEVEL (INNV) | 6/1/2009 | | MORE CONTACTS - FIRST PASS YIELD |
| | IDEA MGT (INNV) | 6/1/2009 | MORE CONTACTS - | |
| | SIX SIGMA (6S) | 6/30/2009 | | FIRST PASS YIELD - |
| | IDEA MGT SYSTEM ENHANCE (INNV) | 9/1/2009 | | MORE CONTACTS - |
| | ECMS REDESIGN (OPS) | 11/30/2009 | FIRST PASS YIELD - | |

| 1300 | BSI DATA CONFIDENCE | | |
|---|---|---|---|
| BUSINESS SUCCESS INDICATOR(S) 1302 | QUESTION 1304 | HOW IS IT DONE TODAY? 1306 | RISK SCORE |
| MORE CONTACTS | WHO COLLECTS THE DATA? | PROGRAM MGT / PMO / PROJECT TEAM | 100% |
| | WHAT IS THE DATA SOURCE? | MANUALLY COLLECTED | 86% |
| | WHAT IS THE FREQUENCY OF THE DATA COLLECTION? | MONTHLY | 100% |
| | ARE THERE ANY DATA QUALITY MEASURES IN PLACE? | YES – POPULATION VERIFICATION | 100% |
| | HOW IS DATA USED? | DIRECT USE BY BUSINESS | |
| | CONFIDENCE SCORE | | 96% |
| FIRST PASS YIELD | WHO COLLECTS THE DATA? | DATA IS NOT COLLECTED | 70% |
| | WHAT IS THE DATA SOURCE? | NEED TO BUILD DATA SOURCE | 70% |
| | WHAT IS THE FREQUENCY OF THE DATA COLLECTION? | ANNUALLY/QUARTERLY | 76% |
| | ARE THERE ANY DATA QUALITY MEASURES IN PLACE? | NO DATA QUALITY MEASURES IN PLACE | 70% |
| | HOW IS DATA USED? | DATA NOT USED BY BUSINESS | |
| | CONFIDENCE SCORE | | 72% |
| CREW SKILLS | WHO COLLECTS THE DATA? | SUPPORT PARTNER | 89% |
| | WHAT IS THE DATA SOURCE? | BUSINESS REPORTING SYSTEM | 93% |
| | WHAT IS THE FREQUENCY OF THE DATA COLLECTION? | DAILY | 96% |
| | ARE THERE ANY DATA QUALITY MEASURES IN PLACE? | YES- DATA ACCURACY | 93% |
| | HOW IS DATA USED? | AD HOC USE OF DATA | |
| | CONFIDENCE SCORE | | 93% |
| | | AVERAGE | 87% |

FIGURE 10

| 1352 | 1354 | | 1356 | | | 1358 | | | |
|---|---|---|---|---|---|---|---|---|---|
| ANSWER | OPERATING | DATA NOT USED BY BUS. | AD HOC USE OF DATA | INDIRECT USE BY BUS. | DIRECT USE BY BUS. | HIGH | MED. | LOW | NO |
| DATA IS NOT COLLECTED | 5 | 5 | 3 | 3 | 3 | 70% | 82% | 82% | 82% |
| PROGRAM MGT / PMO / PROJECT TEAM | 4 | 5 | 3 | 2 | 0 | 76% | 86% | 90% | 100% |
| SUPPORT PARTNER | 3 | 5 | 3 | 1 | 0 | 82% | 89% | 96% | 100% |
| BUSINESS SUPPORT | 2 | 5 | 3 | 1 | 0 | 88% | 93% | 98% | 100% |
| BUSINESS OPERATIONS | 1 | 5 | 3 | 1 | 0 | | | | |
| NEED TO BUILD DATA SOURCE | 5 | 5 | 3 | 3 | 3 | 94% | 96% | 99% | 100% |
| MANUALLY COLLECTED | 4 | 5 | 3 | 3 | 3 | 70% | 82% | 82% | 82% |
| ENTERPRISE REPORTING | 3 | 5 | 3 | 1 | 0 | 76% | 86% | 86% | 86% |
| BUSINESS REPORTING SYSTEM | 2 | 5 | 3 | 1 | 0 | 82% | 89% | 96% | 100% |
| BUSINESS SYSTEM OF RECORD | 1 | 5 | 3 | 1 | 0 | 88% | 93% | 98% | 100% |
| DATA IS NOT COLLECTED | 5 | 5 | 3 | 3 | 3 | 94% | 96% | 99% | 100% |
| ANNUALLY/QUARTERLY | 4 | 5 | 3 | 3 | 3 | 70% | 82% | 82% | 82% |
| MONTHLY | 3 | 5 | 3 | 1 | 0 | 76% | 86% | 86% | 86% |
| WEEKLY | 2 | 5 | 3 | 1 | 0 | 82% | 89% | 96% | 100% |
| DAILY | 1 | 5 | 3 | 1 | 0 | 88% | 93% | 98% | 100% |
| NO DATA QUALITY MEASURES IN PLACE | 5 | 5 | 3 | 3 | 3 | 94% | 96% | 99% | 100% |
| YES – POPULATION VERIFICATION | 4 | 5 | 3 | 1 | 0 | 70% | 82% | 82% | 82% |
| YES – DATA VALIDATION | 3 | 5 | 3 | 1 | 0 | 76% | 86% | 95% | 100% |

FIGURE 11

SELECTION OF BUSINESS SUCCESS INDICATORS BASED ON SCORING OF INTENDED PROGRAM RESULTS, ASSUMPTIONS OR DEPENDENCIES, AND PROJECTS

This invention relates generally to the field of process analysis, and more particularly embodiments of the invention relate to apparatuses (i.e. systems, computer program products, etc.) and methods for selecting, measuring, and reporting metrics to act as a leading indicators of the success of a program as it is being implemented.

BACKGROUND

Great lengths are often taken to identify programs within a business, which may be implemented or improved, through the use of process analysis tools, such as the design for six sigma process. Furthermore, after programs are implemented the health, stability, and effectiveness of the programs are often tracked and measured for analysis of their performance. In some cases, these programs do not always achieve the business benefits that they set out to improve when the programs were initially developed and implemented. Somewhere in the development or implementation phase of the program the wrong metrics are identified as driving the success of the program. Business leaders of many companies are not able to consistently identify and validate whether the anticipated business benefits driving the program are on track to be achieved during the implementation of the program.

There is a need to develop a way to define and measure metrics during the development and implementation of a program that will help in making a determination if the anticipated business benefits of the program will be realized. There is a need to develop apparatuses (i.e. systems, computer program products, and/or other devices) and methods to effectively identify, gather, analyze, and report program indicators throughout the development and implementation of programs, in order to help business leaders make appropriate decisions with respect to the development and implementation of the program.

BRIEF SUMMARY

Embodiments of the present invention address the above needs and/or achieve other advantages by providing apparatuses (i.e. systems, computer program products, etc.) and methods for determining data indicative of business success, as well as a confidence score for the data indicative of business success.

One embodiment of the invention is a system for determining data indicative of the success of a program or projects within a program comprising a memory device, an input device, an output device, a communication device, and a processor. The processor is operatively coupled to the communication device, the memory device, the input device, and the output device. The processor is configured to receive user input from the input device and the communication device related to a program or projects within the program, and store the user input in the memory device. The processor is also configured to receive user input from the input device and the communication device related to the intended program results, and the assumptions or dependencies, and store the user input in the memory device. Furthermore, the processor is configured to assign weighted values to the intended program results, and store the weighted values in the memory device. The processor is also configured to assign impact values to the assumptions or dependencies, and the projects, based on the impact the assumptions or dependencies, and the projects have on the intended program results, and store the impact values on the memory device. Furthermore, the processor is configured to score the intended program results, and the assumptions or dependencies based on the weighted values and the impact values, and store the scores on the memory device. The processor is also configured to select business success indicators from the intended program results, and the assumptions or dependencies, and then display the business success indicators through the use of the output device and the communication device.

In further accord with an embodiment of the invention, the weighed values assigned to the intended program results are ranked numbers.

In another embodiment of the invention, the impact values assigned to the assumptions or dependencies, and the projects are numbers.

In yet another embodiment of the invention, the score of the intended program results, and the assumptions or dependencies is the normalized value or the raw weighted value of the sum of the weighted values multiplied by the impact values.

In another embodiment of the invention, the business success indicators selected to indicate the success of the program have relevant normalized values or raw weighted values.

In further accord with an embodiment of the invention, displaying the business success indicators comprises displaying the business success indicators that have an impact on the projects that are planned for implementation before a program deployment date.

In another embodiment of the invention, the processor is configured to utilize a business success indicator data confidence scoring system for assigning risk scores to the business success indicators.

One embodiment of the invention is a system for determining data indicative of the success of a program or projects within a program comprising a communication device, an input device, an output device, a computer-readable medium, and a processor. The input device is operatively coupled to the communication device and configured to receive information. The output device is operatively coupled to the communication device and configured to display information. The computer-readable medium has computer-readable instructions embodied therein. The processor is operatively coupled to the communication device, the input device, the output device, and the computer readable medium. The processor is configured to execute the computer-readable instructions to receive information related to a program, projects within the program, intended program results, and assumptions or dependencies. The processor is also configured to score the information to determine business success indicators.

In one embodiment of the invention, the score for the information comprises weighted values assigned to the intended program results, wherein the weighted values are stored in the memory device.

In another embodiment of the invention, the weighed values assigned to the intended program results are ranked numbers.

In further accord with an of the invention, the score for the information comprises impact values assigned to the assumptions or dependencies, and the projects, wherein the impact values relate to the impact the assumptions or dependencies, and projects have on the intended program results, and the impact values are stored on the memory device.

In one embodiment of the invention, the impact values assigned to the assumptions or dependencies, and the projects are numbers.

In another embodiment of the invention, the score of the intended program results, and the assumptions or the dependencies is the normalized value or the raw weighted score of the sum of weighted values multiplied by impact values.

In yet another embodiment of the invention, the processor is configured to select business success indicators from the intended program results, the assumptions or dependencies, and display the business success indicators through the use of the output device and the communication device.

In further accord with an embodiment of the invention, the business success indicators are selected on the basis of normalized values or raw weighted values.

In one embodiment of the invention, displaying the business success indicators comprises displaying the business success indicators that have an impact on the projects that are planned for implementation before a program deployment date.

In another embodiment of the invention the processor is configured to utilize a business success indicator data confidence scoring system for assigning risk scores to the business success indicators.

One embodiment of the invention is a system for determining data indicative of the success of a program or projects within a program comprising a communication device, an input device, an output device, a computer-readable medium, and a processor. The input device is operatively coupled to the communication device and configured to receive information. The output device is operatively coupled to the communication device and configured to display information. The computer-readable medium has computer-readable instructions embodied therein. The processor is operatively coupled to the communication device, the input device, the output device, and the computer readable medium. The processor is configured to execute the computer-readable instructions to assign weighted values to intended program results, and store the weighted values in the memory device. The processor is also configured to assign impact values to the assumptions or dependencies, and projects, wherein the impact values relate to the impact the assumptions or dependencies, and projects have on the intended program results, and store the impact values on the memory device. Furthermore, the processor is configured to score the intended program results, and the assumptions or dependencies based on the weighted values and the impact values, and store the scores on the memory device.

In one embodiment of the invention, the processor is configured to execute the computer-readable instructions to receive user input from the input device and the communication device related to a program, projects within the program, and assumptions or dependencies, and store the user input in the memory device.

In another embodiment of the invention the processor is configured to execute the computer-readable instructions to receive user input from the input device and the communication device related to intended program results, and store the user input in the memory device.

In yet another embodiment of the invention the processor is configured to execute the computer-readable instructions to select business success indicators from the intended program results, the assumptions or dependencies, and display the business success indicators through the use of the output device and the communication device.

In another embodiment of the invention, the processor is configured to execute the computer-readable instructions to utilize a business success indicator data confidence scoring system for assigning risk scores to the business success indicators.

One embodiment of the invention is a method of deriving data indicative of business success, the method comprises receiving user input from an input device and a communication device, the user input relates to a program, or projects within the program, and storing the user input in a memory device, wherein the user input is received through the use of a processor operatively coupled to the input device, the communication device, and the memory device. The method further comprises receiving user input from the input device and the communication device, the user input relates to intended program results, and assumptions or dependencies, and storing the user input in the memory device, wherein the user input is received through the use the processor. The method further comprises assigning values to the projects, the intended program results, the assumptions or dependencies, and storing the values in the memory device, wherein assigning values is done through the use of a processor.

In further accord with an embodiment of the invention, assigning values comprises assigning weighted values to the intended program results, and storing the weighted values in the memory device.

In another embodiment of the invention, assigning values comprises assigning impact values to the assumptions or dependencies, and the projects, wherein the impact values relate to the impact the assumptions or dependencies, and the projects have on the intended program results, and storing the impact values on the memory device.

In yet another embodiment of the invention, the method further comprises scoring the intended program results and the assumptions or dependencies based on weighted values and impact values, and storing the scores on the memory device, wherein scoring the intended program results and the assumptions or dependencies is done through the use of a processor.

In one embodiment of the invention, the method further comprises selecting business success indicators from the intended program results, and the assumptions or dependencies, and displaying the business success indicators through the use of an output device operatively coupled to the communication device and the processor.

In another embodiment of the invention, the method further comprises utilizing a business success indicator data confidence scoring system for assigning risk scores to the business success indicators, through the use of the processor.

One embodiment of the invention is a computer program product for identifying business success indicators, the computer program product comprises at least one computer-readable medium having computer-readable program code portions embodied therein. The computer-readable program code comprises an executable portion configured for receiving user input related to a program or projects within the program, and storing the user input in the memory device through a processor operatively coupled to the memory device and the computer-readable program codes. The computer-readable program code also comprises an executable portion configured for receiving user input related to intended program results, and assumptions or dependencies, and storing the user input in the memory device through the use of the processor. The computer-readable program code comprises an executable portion configured for assigning values to the projects, the intended program results, and the assumptions or dependencies, and storing the values in the memory device through the use of the processor.

In further accord with an embodiment of the invention, the executable portion configured for assigning values comprises assigning weighted values to the intended program results, and storing the weighted values in the memory device.

In another embodiment of the invention, the executable portion configured for assigning values comprises assigning impact values to the assumptions or dependencies, and the projects, wherein the impact values relate to the impact the assumptions or dependencies, and the projects have on the intended program results, and storing the impact values on the memory device.

In yet another embodiment of the invention, the computer program product further comprises an executable portion for scoring the intended program results, and the assumptions or dependencies based on weighted values and impact values, and storing the scores on the memory device through the use of a processor.

In one embodiment of the invention, the computer program product further comprises an executable portion for selecting business success indicators from the intended program results and the assumptions or dependencies, and displaying the business success indicators through the use of an output device operatively coupled to the communication device and the processor.

One embodiment of the invention is a system for determining a confidence score for data indicative of the success of a program or project within a program comprising a communication device, an input device, an output device, a computer-readable medium, and a processor. The input device is operatively coupled to the communication device and configured to receive information. The output device is operatively coupled to the communication device and configured to display information. The computer-readable medium has computer-readable instructions embodied therein. The processor is operatively coupled to the communication device, the input device, the output device, and the computer readable medium. The processor is configured to execute the computer-readable instructions to receive a score based on who collects the data, and store the score on a memory device. The processor is also configured to receive a score based on what is the source of the data, and store the score on a memory device. Furthermore, the processor is configured to receive a score based on frequency of collection of the data, and store the score on a memory device. The processor is also configured to receive a score based on the quality measures in place related to the data, and store the score on a memory device.

In further accord with an embodiment of the invention, the processor is configured to execute the computer-readable instructions to receive a score based on how the data is used, and store the score on a memory device.

In another embodiment of the invention, the processor is configured to execute the computer-readable instructions to calculate a risk score based on the combination of the score for how the data is used and the score for who collects the data, what is the source of the data, the frequency of the data, or the quality measure in place.

In yet another embodiment of the invention, calculating the risk score based on a combination of the scores comprises multiplying the score for how the data is used with the score based on who collects the data, what is the source of the data, the frequency of the data, or the quality measure in place.

In another embodiment of the invention calculating the risk score includes normalizing the score.

One embodiment of the invention is a system for determining a confidence score for data indicative of the success of a program or project within a program comprising a communication device, a memory device, a computer-readable medium having computer-readable instructions embodied therein, and a processor. The processor is operatively coupled to the communication device, the memory device, and the computer readable medium and configured to execute the computer-readable instructions to receive a score based on who collects the data, what is the source of the data, the frequency of collection of the data, the quality measures in place related to the data, or how the data is used, and store the scores on a memory device.

In further accord with an embodiment of the invention, the processor is configured to execute the computer-readable instructions to calculate a risk score based on the combination of the score for how the data is used and the scores for who collects the data, what is the source of the data, the frequency of the data, or the quality measure in place.

In one embodiment of the invention, the risk score based on a combination of the scores comprises multiplying the score for how the data is used with the scores based on who collects the data, what is the source of the data, the frequency of the data, or the quality measure in place.

In another embodiment of the invention, calculating the risk score includes normalizing the score.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
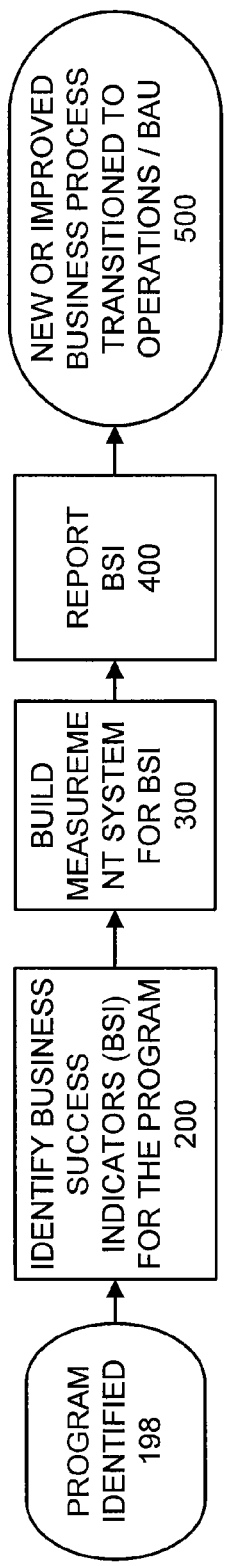
Figure 2:
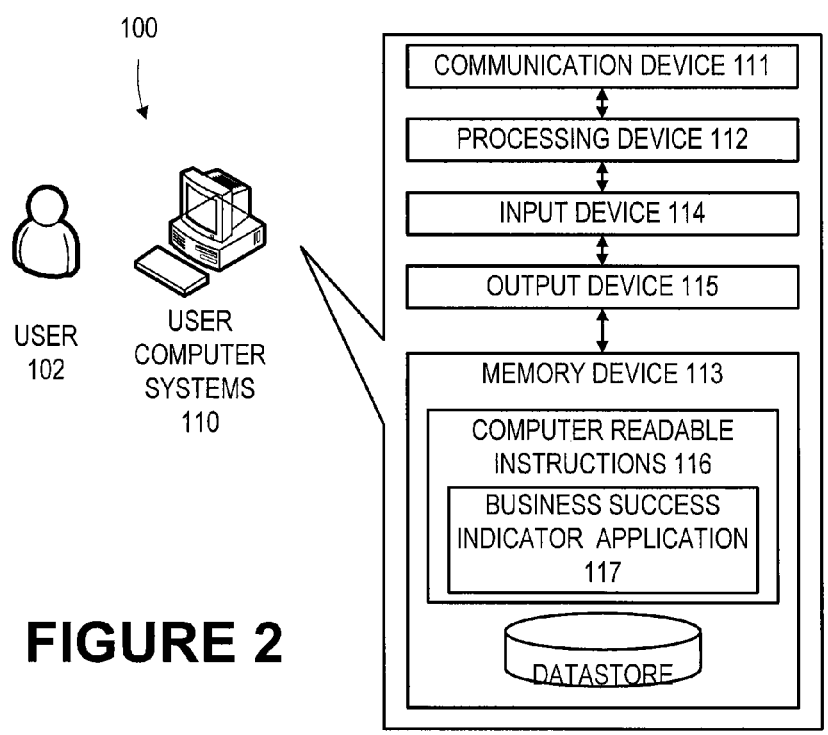
Figure 5:
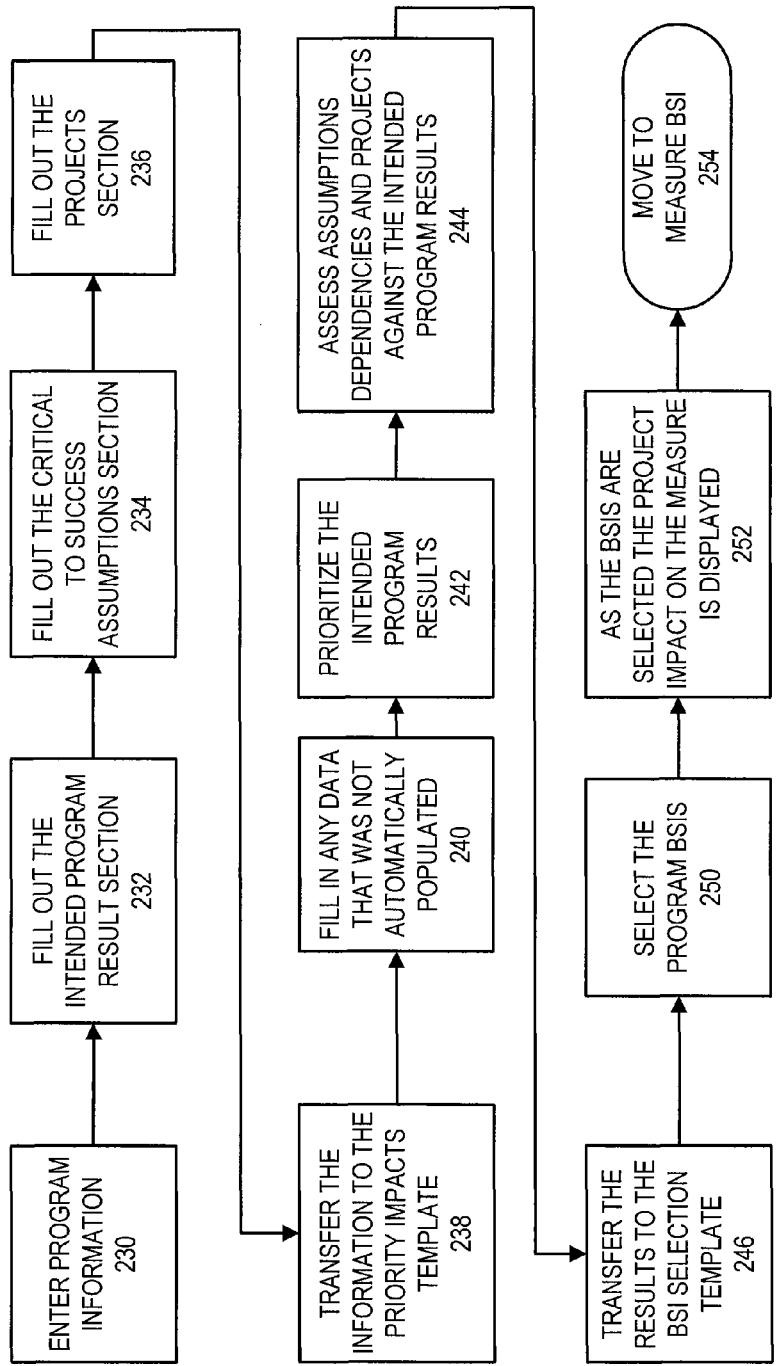
Figure 9:
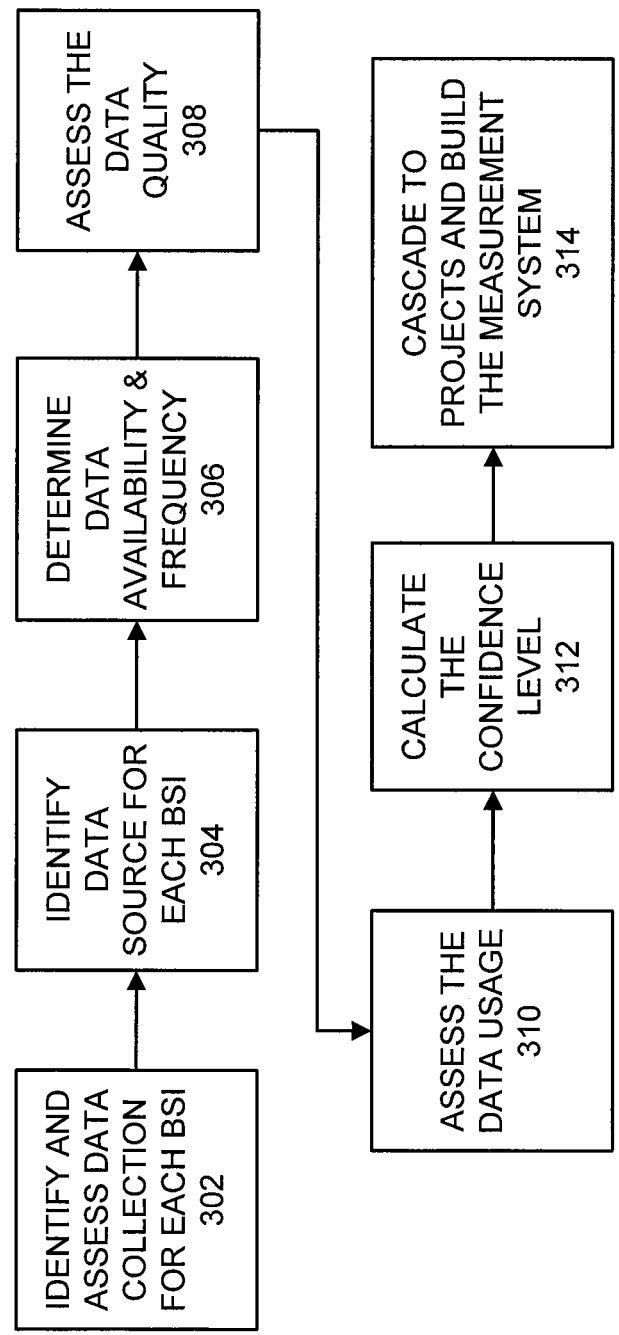

Having thus described embodiments of the invention in general terms, reference will now be made to the accompanying drawings, which are not necessarily drawn to scale, and wherein:

FIG. 1 provides a high level process map for the business success indicator process, in which an embodiment of the present invention exists;

FIG. 2 illustrates a system drawing, in accordance with one embodiment of the present invention;

FIG. 3 illustrates a process map for identifying business success indicators, in accordance with an embodiment of the present invention;

FIG. 4 illustrates an intended program results template, in accordance with an embodiment of the present invention;

FIG. 5 illustrates process map for identifying business success indicators, in accordance with an embodiment of the present invention;

FIG. 6 illustrates a program input template, in accordance with an embodiment of the present invention;

FIG. 7 illustrates an impact priority template, in accordance with an embodiment of the present invention;

FIG. 8 illustrates a business success indicator template, in accordance with an embodiment of the present invention;

FIG. 9 illustrates a process map for building a measurement system for the business success indicators, in accordance with an embodiment of the present invention;

FIG. 10 illustrates a part of a business success indicator confidence template, in accordance with an embodiment of the present invention; and FIG. 11 illustrates another part of a business success indicator confidence template, in accordance with an embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (i.e., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (i.e. systems, computer program products, etc.). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. Alternatively, computer program implemented steps or acts may be combined with operator or human implemented steps or acts in order to carry out an embodiment of the invention.

FIG. 1 illustrates a high level process map for the business success indicator ("BSI") process. As illustrated in FIG. 1, this process begins when a program is identified within the company either while the program is being defined or after the program has begun implementation, as illustrated in block 198. As illustrated in block 200, the first process step is to identify the BSIs for the program being implemented. BSIs are metrics that are used to determine if the program being implemented is going to deliver the intended program results the business desires. The second step is to build the measurement system for the BSIs, which includes determining how data that determines the BSIs will be collected and used, as illustrated by block 300. The final step in the process is to report the BSIs to the appropriate channels.

The BSI process is a change management process that identifies intended program results, assumptions and dependencies. The intended program results, and the assumptions or dependencies are then analyzed to determine if they would be good BSIs to predict the success of a program being analyzed. The BSI process is designed to be a leading indicator of change in the business, which better enables governance decisions to optimize the program investments.

BSIs that serve as leading indicators for implemented changes are currently not routinely created, known, tracked, or analyzed until after the changes are implemented. There are no established criteria in place for how to define the appropriate leading indicators of a business' success as it relates to program implementation. Since the BSIs are not clearly identifiable and are not usually required for implementation projects, there is no mechanism in place for gathering BSI data. Without the appropriate data the progress of programs being implemented is not properly analyzed. Thus, reporting on the status of the implementation of the programs is limited to intuitive monitoring. Without the BSI process a business' ability to make effective decisions related to modifying, stopping, starting, and continuing the process of implementing programs is severely hampered.

A BSI application provides project leaders with the visibility they need to determine whether or not they are on track to achieve their goals early in the life of the project. It allows the leaders to identify measures providing an early view of a project's success, align projects to deliver that success, and track and report the measures.

The BSIs are measurable, with an expected value that is numeric and not monetary. A BSI may be related to a number of data sources including changes in associate behavior or abilities, as well as increases in productivity. If the intended business results begin to be realized before the program implementation is completed, then the intended business results themselves may provide the timeliest indication of business' success. In that case, the intended business results are potential BSIs and may be one of the BSIs chosen by program leadership.

The BSI system and process is used by a management team who is in charge of implementing a change management program. The management team may consist of a number of members, including but not limited to a business sponsor, a quality and production partner, a program leader, a change manager, a representative from a program management office ("PMO"), a finance partner, as well as any other employees who are needed on the team. Each member of the management team may be a user 102 of the BSI process at some point and therefore will have the access to view, as well as the ability to use the BSI system.

FIG. 2 illustrates a business success indicator system 100 in accordance with an embodiment of the present invention. As illustrated in FIG. 2, the user computer systems 110 generally comprise a communication device 111, a processing device 112, a memory device 113, an input device 114, and an output device 115. The processing device 112 is operatively coupled to the communication device 111, the memory device 113, the input device 114, and the output device 115. The processing device 112 uses the communication device 111 to communicate with the user 102. As such, the communication device 111 generally comprises a modem, server, or other device for communicating with other devices in the user computer system or with other systems over networks. The input device 114 generally comprises a display, mouse, keyboard, microphone, and/or speakers for communicating with one or more users 102 and is operatively coupled to the communication device 111. The output device 115 comprises a display, mouse, keyboard, microphone, and/or speakers for communicating with one or more users 102 and is operatively coupled to the communication device 111. As further illustrated in FIG. 1, the user computer systems 110 include computer-readable instructions 116 stored in the memory device 113, which includes the computer-readable instructions 116 of the BSI application. The BSI application 117 allows a user 102 to identify indicators of the success of a program being implemented as the implementation process is ongoing.

The user 102 may utilize the input device 114 to enter information into the BSI application 117 through the communication device 111 and processing device 112. The processing device 112 takes the user input into the BSI application 117 and utilizes the communication device 111 to output the information entered by the user to the output device 115. Furthermore, the information entered is stored in the memory device 113.

FIG. 3, illustrates a process flow for the BSI application used to help the management team identify the correct BSIs. To begin the process the user may utilize the intended program results template 1200 which is illustrated in FIG. 4. The intended program results template 1200 helps a user 102 organize and identify the information needed for the other parts of the BSI process. As illustrated in block 202 of FIG. 3, a user 102 starts the BSI process by populating the intended program results template 1200 with the program that the business is trying to implement in the program column 1202. For example, in FIG. 4 the program the business is looking to implement is to increase sales volumes.

The user 102 may then fill out the strategic priority column, as illustrated in block 204. The strategic priority column 1204 includes the primary business objective for the program being implemented. The program is the driver of the business objective in the strategic priority column 1204. For example, in FIG. 4, the strategic priority for the increased sales volume program is to increase revenue growth.

Thereafter, as illustrated by block 206, the user 102 will populate the intended program results column 1212. The intended program results column 1212 is populated with the variable that will drive the program and ultimately the strategic priority. The user 102 identifies a few intended program results for each program being implemented, as illustrated in FIG. 4. The intended program results are the results to be achieved from a change initiative. Intended program results may include products, operating metrics, a change in units that results in the elimination or reduction of cost, the number of time periods revenue is realized earlier than planned, improvement in customer or associate satisfaction, etc. Intended program results frequently become monetized as business benefits. Examples of monetized business benefits include revenue increase of a specific dollar amount, cost saving of a specific dollar amount, etc. Examples of non-monetized business benefits include increases in customer satisfaction, decrease in risk profile, etc. The intended program results should not be program health metrics, program milestones, or the date on which an event occurs. As illustrated in FIG. 4, examples of the intended business benefits that will drive the increased sales program are more contacts, rate cycle time, and first pass yield. For example by increasing the number of contacts, reducing the amount of time spent with each customer, or generating more revenue from the first interaction with the customers, sales volumes will increase and therefore revenue growth will increase. While determining the intended program results, the user 102 also obtains concurrence of the proposed intended program results with the management team, as illustrated by block 208. The concurrence with the management team is necessary in some cases, in order to assure that the proper intended program results are indentified across the business.

The leading or lagging column 1210 in the intended program results template 1200 helps to further identify and describe the intended program results. Leading measures are closest to the operating process and can be described as drivers or independent variables. Lagging measures are aggregated at different levels of the business process. They can be described as dependent variables. The user 102 may populate this column, as illustrated by block 210, in order to help identify if the intended program results are measurable before or after the implementation of the program or the individual projects within the program. It also will help determine if data has already been, or will be collected for each intended program result.

The units or impact column 1214, lists the desired improvement that will occur for the intended program results after the program is implemented. As illustrated by block 212, the user 102 lists in this column the quantitative or qualitative metrics of the intended program results that are expected. Some examples of the metrics include the number of new or existing products sold, the number of events that did not occur resulting in expense savings, productivity improvements in operating metrics, percentage improvement in customer or associate satisfaction, etc.

The baseline column 1216 is needed to illustrate the improvement for the metrics of the intended program results over the baseline that occurs as a result of implementing the program. As illustrated by block 214, the user 102 fills out the baseline metrics that the program is trying to improve upon. The difference between the impact column 1214 and the baseline column 1216 shows the improvement desired from the implementation of the program.

The dependent benefits column 1218 is the second to last column in the intended program results template 1200. If the intended program results for the program are dependent upon another program, the user 102 lists the name of the secondary program in this column, as illustrated by block 216. Furthermore, as illustrated by diamond 218 and block 220, if the intended program results are in fact dependent on another program, the user 102 needs to conduct a separate BSI process for the interdependent program. If however, the intended program results are not dependent on another program then the user 102 moves on to determine the assumptions or dependencies that are critical to success, as illustrated by block 222. The assumptions or dependencies column 1220 is for noting any assumptions or dependencies related to any portion of the program or projects within the program that are critical to success of the program.

After the intended program results are identified, the user 102 transfers the data, automatically or manually to the program input template 1230, as illustrated by block 224. FIG. 6 illustrates an example of the program input template 1230, which may be used to help further organize and define the intended program results, assumptions or dependencies, and the projects and deployment dates. This template may be populated, at least in part, by the information the user 102 entered into the intended program results template 1200.

The user 102 enters the program name and line of business in the header 1232 of the template along with the requested program deployment date 1234, as illustrated by block 230 in FIG. 5. Thereafter, the user 102 fills out the intended program result section 1236, as illustrated by block 232. The user 102 selects the type of productivity improvement 1237 for the intended program results previously identified. The productivity improvement 1237 can be, but is not limited to the following categories: associate satisfaction, customer satisfaction, incremental units of an existing product, new product, operating metric, reduce cost or expense, or revenue received earlier. The user 102 also documents the description, incremental units, and baseline units of the intended program results, if this was not already done in the intended program results template 1200. For each intended program result the user should consider whether the intended program result is or can be represented by a leading measure as these will be more likely to yield early indications of success. A second consideration is whether, if controlled, a change in the leading measure will contribute to a visible change in the intended program result (leading measures are closest to the operating process and can be described as drivers or independent variables).

As illustrated by block 234, the user 102 then populates the critical to success assumptions and dependencies section 1238 including the type of assumption and dependencies, the description, the numeric assumption and the baseline of each, if these were not already captured in the intended program results template 1200. The user 102 will categorize the assumption or dependency as a specific type including but not limited to the following: business case assumption, associate adoption, technology resources, and other critical assumption or dependency. The assumptions or dependencies need to be met in order for the program to be successful. If they are not met, the intended program results are at risk. In one embodiment this section should list the five most important assumptions or dependencies for the program, but in other embodiments any number of assumptions and dependencies may be listed.

In some embodiments of the invention the intended program results section 1236 and the critical to success assumption 1238 also have an operating definition column (not shown). This column provides an area for documenting a definition of the intended program result, and the assumption or dependency, and a description of how each is measured. The operating definition provides a common understanding of the measurement, how it is measured (calculated), and therefore reduces the likelihood that the selected BSIs will fail the data confidence step, which is outlined later. The operating definition becomes relevant when the impact of a project or assumption on an intended program result, or the assumption or dependency is assessed. An operating definition should be agreed upon for each intended program result, and assumption or dependency before moving to the select BSI template 1260.

The user 102 also populates the projects section 1239 of the program input template 1230, as illustrated by block 236. The projects are the individual goals and deadlines within the overall program that will help achieve the intended program results. The individual project titles and estimated deployment dates for the program should be included in the program input template 1230 by the user 102. After the program input template 1230 is completed the user 102 transfers the information to the priority impacts template 1240, as illustrated by block 238.

The priority impacts template 1240 helps the user 102 assess the importance of the assumptions or dependencies, and projects against each intended program result, an example of which is illustrated in FIG. 7. The priority impacts template 1240 can be filled out, in part, by automatically pulling in information from the other templates, or by the having the user 102 enter data in the required fields. The intended program results, assumptions or dependencies, and projects, along with the project timing are transferred from the program input template 1230 and the intended program results template 1200. The user 102 then populates the priority impacts template 1240 with any data that was not transferred from the program input template 1230 or the intended program results template 1200, as illustrated by block 240.

The user 102 prioritizes the intended program results listed in the in the intended program results column 1242, by assigning weighted values in the priority weighting column 1244, as illustrated by block 242. The highest priority intended program result should have the highest number. If there are four (4) possible intended program results the highest priority intended program result is ranked four (4) and the lowest priority intended result is ranked one (1).

Thereafter each assumption or dependency, and project is assessed by the user 102 against each intended program result from a high, medium, low, or no impact standpoint in the assumptions/dependencies column 1246 and the project/timing column 1248, as illustrated by block 244. The high, medium, low, and no impact categories are each assigned a numeric value of nine (9), three (3), one (1), and zero (0) in order from high to low. In other embodiments of the invention, a different scoring system, such as a ranking or percentage score could be used to assess the assumptions or dependencies, and projects against the intended program results.

FIG. 7 also illustrates the normalized intended results table 1250. The normalized intended results table sums the raw weighted score for each of the intended program results in the raw weight column 1252. The scores are normalized by dividing the raw weight for each intended result by the total raw weight for the intended program results and assumptions, and the scores are listed in the BSI normalized column 1254. After the BSI normalized scores are calculated the user 102 transfers the data to the BSI selection template 1260, as illustrated by block 246. In other embodiments of the invention, the raw weights may be transferred to the BSI selection template 1260 along with or instead of the normalized score and thereafter used to select the most relevant BSIs.

As illustrated by block 250, the next step in the process is for the user 102 to select the program BSIs. FIG. 8 illustrates an embodiment of the BSI selection template 1260 that is used for the selecting the program BSIs. The BSI selection template 1260 can be pre-populated, in part, from the intended program results template 1200, the program input template 1230, the priority impacts template 1240, and the intended results table 1250. The potential BSIs column 1264, the priority column 1266, and the ranked importance column 1268, are populated from the priority impacts template 1240. The projects column 1270 and the estimated project deployment dates 1272 are also populated with the data from the priority impacts template 1240 or the program input template 1230.

The user 102 utilizes drop down menus in the drop down column 1262, in order to select what potential BSIs from the potential BSIs column 1264 should be identified as the actual BSIs, as illustrated by block 250. The priority column 1266 illustrates the priority assigned by the user 102 from the priority impact template 1240. If the priority column 1266 is blank for an associated potential BSI, this represents that the potential BSI is an assumption or dependency. The ranked importance column 1268 illustrates the order of the importance as determined from the priority impact template 1240. The ranked importance column 1268 is illustrated as ranking the potential BSIs as a percentage, however in other embodiments the BSIs may be ranked in other ways. For example, the potential BSIs may be ranked on a weighted score basis. Additionally, a column is provided illustrating the difference between each weighted score and the next highest weighted score. It is understood that the potential BSIs may be ranked on a number of different scales.

As the user 102 identifies the BSIs by selecting "yes" from the drop down column 1262, the project impact is displayed in the high impact column 1274 or the moderate impact column 1276. Projects deploying after the date listed in the requested program deployment date column 1278 (populated from the program input template 1230) are shaded gray, or otherwise distinguished from the projects deploying before the requested program deployment date. Early indicators of whether the program is on track occur with projects that have a deployment date before the requested program deployment date. The BSIs that serve as early indicators of the success of the program are the BSIs that have a high or moderate impact on the projects that deploy before the requested program deployment date.

After the appropriate BSIs are selected by the user 102, they should be measured, as illustrated by terminator block 254. One embodiment of the BSI measure process 300 is illustrated in FIG. 9. The BSI measure process utilizes the BSI measurement template 1300, which is illustrated in FIGS. 10 and 11. In FIG. 10 the BSI column 1302 is populated with the selected BSIs from the BSI selection template 1260. The BSI measurement template 1300 also includes a question column 1304, a current response column 1306, and a risk score column 1308 for identifying the risk associated with each BSI.

The questions to be answered for scoring the risk of the BSIs are: who collects the data; what is the data source; what is the frequency of the data collection; are there data quality measures in place; and how is the data collected. The data collection, source, frequency and quality measures when combined with how the data is used result in the risk score.

Each step in the BSI measure process builds upon the previous step in order to develop a solid BSI measurement plan in support of the selected BSIs. As illustrated by block 302 in FIG. 9, the first step in the process is to identify and assess the data collection for each BSI. This step involves determining, in regard to the BSI being evaluated, what data is in the system that is currently collected or can be collected and who collects that data. The responses to the data collection question, in one embodiment, are that the data is not collected, or the program management team, the support partner, business support, or business operations collects the data. The types of data collection are assigned weighted average percentages, for example if the program management is collecting the data the score might be 100%, however, if the data is not collected the score might be 70%.

Once the user 102 identifies that there is data or data can be collected, then the user 102 identifies the source of the data, as illustrated by block 304. For the specific BSI being examined the user 102 indicates that the data source either needs to be built, is manually collected, is collected by enterprise reporting, is collected by the business reporting system, or is collected by the business system of record. Again, each of these responses is assigned a percentage risk score illustrating the risk associated with accuracy/reliability of the data collection source.

The user 102 then determines the data availability and frequency, as illustrated by block 306. The user 102 indicates in the BSI data confidence template 1300 if the data is collected on a daily, weekly, monthly, quarterly or yearly basis, or not at all. Again, each of these responses is assigned a percentage risk score illustrating the risk associated with collecting the data on each of the time intervals. For example, for the most part collecting data on a weekly basis is less risky than collecting data on a yearly basis, because the performance is tracked over a more frequent period of time.

As illustrated by block 308, the user 102 then assesses the data quality. The user 102 will determine whether or not there are data quality measures in place. If there are data quality measures in place the user determines if the measures include population verification, data validation, or data accuracy. Each of these responses is assigned a percentage risk score illustrating the risk associated with the quality measures in place.

The user 102 then assesses the data usage, as illustrated by block 310. Determining the data usage scores includes utilizing the user's 102 own knowledge of current practices to assess risks associated with current data usage. First, the user 102 identifies if the data is not used by the business, used on an ad hoc basis, used indirectly by the business, or used directly by the business. Each of these responses is assigned a percentage risk score illustrating the risk associated with the data usage. In one embodiment of the invention determining how the data is used results in determining the risk score for the first four questions of the BSI data confidence template 1300.

The next step in the process is to calculate the confidence levels of the data collected for each of the BSIs as illustrated by block 312. In one embodiment of the invention the risk scores can be assigned directly to each response for each BSI, as previously described. In other embodiments the risk score column 1308 is automatically calculated, by multiplying a potential impact score by the occurrence probability that the impact will happen.

In one embodiment, as illustrated in FIG. 11, a scoring matrix 1350 is provided comparing all of the answers to the collection, source, frequency and quality questions against how the data is used. The answers are listed in the answers column 1352. Each answer is assigned an operating score in the operating column 1354 from five (5) being the highest risk to one (1) being the lowest risk. The data usage columns 1356 are populated with a score of five (5) being the highest risk to zero (0) being no risk at all. The matrix is then normalized to calculate the normalized scores as listed in the high, medium, low, and no risk columns 1358.

For example, under the BSI column 1302 the more contacts BSI data is collected by program management and the usage of the data is direct use by the business. Therefore, in FIG. 11, program management has an operating risk of four (4) and the direct uses by the business has a score of zero (0). Four (4)

multiplied by zero (0) is zero (0), and the normalized score of a risk of zero (0) is 100% confidence.

In some embodiments a judgment factor may by applied to calculating the scores in the risk columns 1358. In one embodiment this score may be a factor of 0.3. The 0.3 factor, in this case, is based on the judgment that the score resulting from the equation should not be less than seventy percent (70%). Therefore, for example, in this instance the worst case scenario of data not collected (score of 5) multiplied by data not used by business (score of 5) results in the fraction of 25/25. This fraction is multiplied by 0.3 resulting in the value of 0.3. The order of calculation precedence then subtracts from 1.0 the value of 0.3 to return the worst case rating of 70%. The scoring is based on the realization that data that is frequently collected and actually used in the business' management routines will be more accurate and effective than data that is not. Different questions, scores, and factors may be utilized or entered into the matrix for defining the risk associated with the measurement data for each BSI.

As previously discussed, the responses to the questions may have pre-determined scoring answers that help assess the risk score. However, in other embodiments the BSI data confidence scoring system described above may be used in part or other scoring systems may be used to define the risk scores. In one embodiment the scores for each response for each BSI are weighted equally and averaged to obtain the confidence score for each BSI. However, in other embodiments different weighted averages may be applied to the various responses, thus weighting the responses as more or less important to each of the BSIs.

After the confidence scores are calculated, the confidence levels are cascaded to the projects and the overall program, and then the measurement plan is built, as illustrated by block 314. Under this step the selected BSIs, their confidence assessments, and whether they are expected to be early indicators are analyzed by the management team for each of the projects and programs. This includes ensuring that the BSIs, as early indicators, receive appropriate scrutiny as the projects complete the various phases of implementation.

After the proper measurement system is in place and the analysis is performed, the user 102 should report the BSIs, as illustrated by block 400. The BSIs may be reported in many different ways, but in one embodiment there are four steps. These steps include: first, setup the BSI in a portal; second, get actual values for the BSI tracking period; third, update the BSI system of record with actual values of the BSI; and fourth, generate the BSI reports.

Setting up the BSI in a portal, may include setting up the BSI in a hoshin portal, in some cases. Thereafter, the next step is to get actual values for the BSI during the tracking period. In this step the user 102, sometimes a change manager or a representative from the program management office ("PMO"), utilizes the project's measurement plan to obtain values for the BSIs during the current tracking period. If a program has multiple BSIs resulting from the work of multiple projects, more than one user 102 may be involved in providing data. The BSI system of record is updated with the actual values of the BSI. The BSI report is created by the user 102 and sent to the appropriate channels for the analysis of the program being implemented.

Specific embodiments of the invention are described herein. Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A system for determining data indicative of a success of a program, or projects within the program, comprising:
   a memory device;
   an input device;
   an output device;
   a communication device; and
   a processor operatively coupled to the communication device, the memory device, the input device, and the output device, wherein the processor is configured to:
   receive user input from the input device and the communication device related to the program within a business, and store the user input related to the program within the business in the memory device;
   receive user input from the input device and the communication device related to intended program results, and store the user input related to the intended program results in the memory device;
   receive user input from the input device and the communication device related to weighted values for the intended program results, and store the weighted values in the memory device, wherein the weighted values are normalized to prioritize each of the intended program results with respect to each other and store the weighted values for the intended program results on the memory device;
   receive user input from the input device and the communication device related to assumptions or dependencies related to the program, wherein the assumptions or dependencies define critical resources that are desired to be met in order for the program to be successful, and store the assumptions or dependencies on the memory device;
   receive user input from the input device and the communication device related to impact values for the assumptions or dependencies, wherein the impact values for the assumptions or dependencies are based on an impact each of the assumptions or dependencies have on each of the intended program results, and store the impact values on the memory device;
   receive user input from the input device and the communication device related to the projects within the program, wherein the projects are individual goals and deadlines of the program that help achieve the intended program results and store the projects on the memory device;
   receive user input from the input device and the communication device related to impact values for the projects, wherein the impact values for the projects are based on the impact of each of the projects on each of the intended program results, and store the impact values on the memory device;
   determine a score for each of the intended program results, wherein the score is based on the weighted value of the intended program results, the impact values for the assumptions or dependencies associated with the intended program results, and the impact values for the projects associated with the intended program results, and store the score for each of the intended program results on the memory device;
   determine a score for each of the assumptions or dependencies, wherein the score for each of the assumptions or dependencies is based on the weighted value of the intended program results, and the impact values for the assumptions or dependencies for the intended program results, and store the score for each of the assumptions or dependencies on the memory device;

identify business success indicators, from the intended program results and the assumptions or dependencies, wherein the business success indicators are based on the determined score for each of the intended program results and the determined score for each of the assumptions or dependencies, and then display the business success indicators through the use of the output device and the communication device; and determine a confidence score for each of the identified business success indicators by: normalizing an arithmetic product of operating scores quantifying answers to data collection, data source, data frequency, and data quality of the business success indicators by scores quantifying how the data is used by the business, and applying a judgment factor to ensure a minimum confidence score, and combining the operating scores into the confidence score.

2. The system of claim 1, wherein the weighted values assigned to the intended program results are ranked numbers.

3. The system of claim 1, wherein the impact values assigned to the assumptions or dependencies, and the projects are numbers.

4. The system of claim 1, wherein the scores of the intended program results, and the assumptions or dependencies are a normalized value or a raw weighted value of a sum of the weighted values for the intended program results multiplied by the impact values.

5. The system of claim 1, wherein the identified business success indicators have relevant normalized values or raw weighted values.

6. The system of claim 1, wherein displaying the business success indicators comprises displaying the business success indicators that have an impact on the projects that are planned for implementation before a program deployment date.

7. A system for determining data indicative of a success of a program or projects within the program comprising:
a communication device;
an input device operatively coupled to the communication device and configured to receive information;
an output device operatively coupled to the communication device and configured to display information;
a computer-readable medium having computer-readable instructions embodied therein; and
a processor operatively coupled to the communication device, the input device, the output device, and the computer-readable medium and configured to execute the computer-readable instructions to:
receive information related to the projects within the program, intended program results, and assumptions or dependencies, wherein the assumptions or dependencies define critical resources that should be met in order for the program to be successful;
score the information related to the projects, the intended programs, and the assumptions or dependencies to determine business success indicators; and
determine a confidence score for each of the business success indicators by: normalizing an arithmetic product of operating scores quantifying answers to data collection, data source, data frequency, and data quality of the business success indicators by scores quantifying how the data is used by the business, applying a judgment factor to ensure a minimum confidence score, and combining the operating scores into the confidence score.

8. The system of claim 7, wherein the score for the information comprises:
weighted values assigned to the intended program results, wherein the weighted values are stored in the memory device.

9. The system of claim 8, wherein the weighted values assigned to the intended program results are ranked numbers.

10. The system of claim 7, wherein the score for the information comprises:
impact values assigned to the assumptions or dependencies, and the projects, wherein the impact values relate to the impact the assumptions or dependencies, and projects have on the intended program results, and the impact values are stored on the memory device.

11. The system of claim 10, wherein the impact values assigned to the assumptions or dependencies, and the projects are numbers.

12. The system of claim 7, wherein the scores of the intended program results, and the assumptions or dependencies are a normalized value or a raw weighted value of a sum of weighted values multiplied by impact values.

13. The system of claim 7, wherein the processor is configured to:
select business success indicators from the intended program results, and the assumptions or dependencies, and display the business success indicators through the use of the output device and the communication device.

14. The system of claim 13, wherein the business success indicators are selected on a basis of normalized values or raw weighted values.

15. The system of claim 14, wherein displaying the business success indicators comprises displaying the business success indicators that have an impact on the projects that are planned for implementation before a program deployment date.

16. A system for determining data indicative of a success of a program or projects within the program comprising:
a communication device;
an input device operatively coupled to the communication device and configured to receive information;
an output device operatively coupled to the communication device and configured to display information;
a computer-readable medium having computer-readable instructions embodied therein; and
a processor operatively coupled to the communication device, the input device, the output device, and the computer-readable medium and configured to execute the computer-readable instructions to:
assign weighted values to intended program results, and store the weighted values in the memory device;
assign impact values to assumptions or dependencies and the projects, wherein the impact values relate to the impact the assumptions or dependencies and the projects have on the intended program results, and store the impact values on the memory device;
score the intended program results and the assumptions or dependencies based on the weighted values and the impact values, and store the scores on the memory device;
select business success indicators, including the intended program results and the assumptions or dependencies, wherein the business success indicators are based on the determined scores for each of the intended program results and each of the assumptions or dependencies, and then display the selected business success indicators through the use of the output device and the communication device; and determine a confidence score for each of the selected business success indicators by: normalizing an arithmetic product of operating scores quantifying answers to data collection, data source, data frequency, and data quality of the business success indicators by scores quantifying how the data is used by the business, applying a judgment factor to ensure a minimum confidence score, and combining the operating scores into the confidence score.

17. The system of claim 16, wherein the processor is configured to execute the computer-readable instructions to:

receive user input from the input device and the communication device related to the program, the projects within the program, and the assumptions or dependencies, and store the user input related to the program, the projects within the program and the assumptions or dependencies in the memory device.

18. The system of claim 16, wherein the processor is configured to execute the computer-readable instructions to:

receive user input from the input device and the communication device related to the intended program results, and store the user input related to the intended program results in the memory device.

19. The system of claim 16, wherein the processor is configured to execute the computer-readable instructions to:

select the business success indicators from the intended program results, the assumptions or dependencies, and display the business success indicators through the use of the output device and the communication device.

20. A method of deriving data indicative of business success, the method comprising:

receiving, by a processor, user input from an input device and a communication device, the user input relates to projects within a program, and storing the user input related to the projects within the program in a memory device, wherein the user input related to the projects within the program is received through the use of a processor operatively coupled to the input device, the communication device, and the memory device;

receiving, by the processor, user input from the input device and the communication device related to intended program results, and store the user input related to the intended program results in the memory device;

receiving, by the processor, user input from the input device and the communication device related to weighted values for the intended program results, wherein the weighted values are normalized to prioritize each of the intended program results with respect to each other, and store the weighted values on the memory device;

receiving, by the processor, user input from the input device and the communication device related to assumptions or dependencies related to the program, wherein the assumptions or dependencies define critical resources that are desired to that should be met in order for the program to be successful, and store the assumptions or dependencies on the memory device;

receiving, by the processor, user input from the input device and the communication device related to impact values for the assumptions or dependencies, wherein the impact values are based on the impact each of the assumptions or dependencies have on each of the intended program results, and store the impact values on the memory device;

receiving, by the processor, user input from the input device and the communication device related to the projects within the program, wherein the projects are individual goals and deadlines of the program that help achieve the intended program results and store the projects on the memory device;

receiving, by the processor, user input from the input device and the communication device related to impact values for the projects, wherein the impact values are based on the impact of each of the projects on each of the intended program results, and store the impact values on the memory device;

determining, by the processor, a score for each of the intended program results, wherein the score for each of the intended program results is based on the weighted value of the intended program result, the impact values for the assumptions or dependencies associated with the intended program result, and the impact values for the projects associated with the intended program result, and store the scores on the memory device;

determining, by the processor, a score for each of the assumptions or dependencies, wherein the score for each of the assumptions or dependencies is based on the weighted value of the intended program result, and the impact values for the assumptions or dependencies for the intended program results, and store the scores on the memory device;

identifying, by the processor, business success indicators, from the intended program results and the assumptions or dependencies, wherein the business success indicators are based on the determined scores for each of the intended program results and each of the assumptions or dependencies, and then display the business success indicators through an output device and a communication device; and determining, by the processor, a confidence score for each of the identified business success indicators by: normalizing an arithmetic product of operating scores quantifying answers to data collection, data source, data frequency, and data quality of the business success indicators by scores quantifying how the data is used by the business, applying a judgment factor to ensure a minimum confidence score, and combining the operating scores into confidence score.

21. The method of claim 20, wherein determining, by the processor, a score for each of the intended program results, comprises:

assigning weighted values to the intended program results, and storing the weighted values in the memory device.

22. The method of claim 20, comprising:

selecting the business success indicators from the intended program results, and the assumptions or dependencies, and displaying the business success indicators through the use of the output device operatively coupled to the communication device and the processor.

23. A computer program product for identifying business success indicators, the computer program product comprising at least one non-transitory computer-readable storage media with program code portions comprising:

an executable portion configured for receiving user input related to a program;

an executable portion configured for receiving user input related to intended program results;

an executable portion configured for receiving user input related to weighted values for the intended program results, wherein the weighted values are normalized to prioritize each of the intended program results with respect to each other;

an executable portion configured for receiving user input related to assumptions or dependencies, wherein the assumptions or dependencies define critical resources that are desired to be met in order for the program to be successful;

an executable portion configured for receiving user input related to impact values for the assumptions or dependencies, wherein the impact values are based on the impact each of the assumptions or dependencies have on each of the intended program results;

an executable portion configured for receiving user input related to projects within the program, wherein the projects are individual goals and deadlines of the program that help achieve the intended program results and store the projects on the memory device;

an executable portion configured for receiving user input related to impact values for the projects, wherein the impact values are based on the impact of each of the projects on each of the intended program results;

an executable portion configured for determining a score for each of the intended program results, wherein the score for each of the intended program results is based on the weighted value of the intended program result, the impact values for the assumptions or dependencies associated with the intended program result, and the impact values for the projects associated with the intended program result;

an executable portion configured for determining a score for each of the assumptions or dependencies, wherein the score for each of the assumptions or dependencies is based on the weighted value of the intended program result, and the impact values for the assumptions or dependencies for the intended program results;

an executable portion configured for identifying the business success indicators, from the intended program results and the assumptions or dependencies, wherein the identified business success indicators are based on the determined scores for each of the intended program results and each of the assumptions or dependencies, and then display the business success indicators through the use of an output device and a communication device; and an executable portion configured for determining a confidence score for each of the selected business success indicators by: normalizing an arithmetic product of operating scores quantifying answers to data collection, data source, data frequency, and data quality of the business success indicators by scores quantifying how the data is used by the business, applying a judgment factor to ensure a minimum confidence score, and combining the operating scores into the confidence score.

24. The computer program product of claim 23, further comprising:

an executable portion for selecting the business success indicators from the intended program results and the assumptions or dependencies, and displaying the business success indicators through the use of the output device operatively coupled to the processor.

25. A system for determining a confidence score for data indicative of a success of a program or project within the program comprising:

a communication device;

an input device operatively coupled to the communication device and configured to receive information;

an output device operatively coupled to the communication device and configured to display information;

a computer-readable medium having computer-readable instructions embodied therein; and a processor operatively coupled to the communication device, the input device, the output device, and the computer-readable medium and configured to execute the computer-readable instructions to:

receive user input related to intended program results and assumptions or dependencies, wherein the assumptions or dependencies define critical resources that should be met in order for the program to be successful, and storing the user input related to the intended program results and the assumptions or dependencies in a memory device through the use of the processor;

determine a score for each of the intended program results and assumptions or dependencies;

select business success indicators, from the intended program results and the assumptions or dependencies, wherein the business success indicators are based on the determined scores for each of the intended program results and each of the assumptions or dependencies;

receive a first operating score based on who collects the data, and store the score on a memory device;

receive a second operating score based on what is the source of the data, and store the score on the memory device;

receive a third operating score based on frequency of collection of the data, and store the score on the memory device;

receive a fourth operating score based on the quality measures in place related to the data, and store the score on the memory device; and determine a confidence score for each of the selected business success indicators by: normalizing an arithmetic product of each of the first, second, third and fourth operating scores by scores quantifying how the data is used by the business, applying a judgment factor to ensure a minimum confidence score, and combining the operating scores into a confidence score.

26. The system of claim 25, wherein the processor is configured to execute the computer-readable instructions to:

receive the scores quantifying how the data is used, and store the score on a memory device.

27. A system for determining a confidence score for data indicative of a success of a program or project within the program comprising:

a communication device;

a memory device;

a computer-readable medium having computer-readable instructions embodied therein; and a processor operatively coupled to the communication device, the memory device, and the computer-readable medium and configured to execute the computer-readable instructions to:

receive user input related to intended program results and assumptions or dependencies, wherein the assumptions or dependencies define critical resources that should be met in order for the program to be successful, and storing the user input related to intended program results and assumptions or dependencies in the memory device through the use of the processor;

determine a score for each of the intended program results and assumptions or dependencies;

select business success indicators, from the intended program results and the assumptions or dependencies, wherein the business success indicators are based on the determined scores for each of the intended program results and each of the assumptions or dependencies;

receive scores based on who collects the data, what is the source of the data, a frequency of collection of the data, quality measures in place related to the data, and how the data is used, and store each of the scores on a memory device; and determine a confidence score for each of the selected business success indicators by: normalizing an arithmetic product of the scores based on who collects the data, what is the source of the data, the frequency of collection of the data, and the quality measures in place related to the data by the score quantifying how the data is used, and subtracting a judgment factor to ensure a minimum confidence score.

* * * * *